(12) United States Patent
Borlick et al.

(10) Patent No.: US 10,528,435 B2
(45) Date of Patent: Jan. 7, 2020

(54) PERFORMANCE EFFICIENT TIME LOCKS ON DATA IN A STORAGE CONTROLLER

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Carol S. Mellgren, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 15/589,324

(22) Filed: May 8, 2017

(65) Prior Publication Data

US 2018/0321998 A1 Nov. 8, 2018

(51) Int. Cl.
*G06F 11/14* (2006.01)

(52) U.S. Cl.
CPC .... *G06F 11/1471* (2013.01); *G06F 2201/805* (2013.01); *G06F 2201/82* (2013.01)

(58) Field of Classification Search
CPC ............................... G06F 11/07; G06F 11/079
USPC .......................................................... 714/19
See application file for complete search history.

(56) References Cited

U.S. PATENT DOCUMENTS

| | | | |
|---|---|---|---|
| 6,389,420 B1 | 5/2002 | Vahalia et al. | |
| 6,711,687 B1 | 3/2004 | Sekiguchi | |
| 7,010,493 B2 | 3/2006 | Yamamoto et al. | |
| 7,313,557 B1 | 12/2007 | Noveck | |
| 7,340,640 B1 * | 3/2008 | Karr | G06F 3/0613 711/209 |
| 8,185,754 B2 * | 5/2012 | Gill | G06F 1/3221 713/300 |
| 8,200,774 B1 * | 6/2012 | Redstone | G06F 9/526 707/704 |
| 8,423,505 B2 | 4/2013 | Chauvet et al. | |
| 8,732,417 B1 * | 5/2014 | Stringham | G06F 11/1448 711/162 |
| 8,954,408 B2 * | 2/2015 | Dudgeon | G06F 17/30371 707/704 |
| 9,075,762 B2 | 7/2015 | Lahousse et al. | |
| 9,218,295 B2 | 12/2015 | Cohen | |
| 9,497,268 B2 | 11/2016 | Metzler et al. | |
| 9,853,949 B1 | 12/2017 | Stickle et al. | |
| 9,875,041 B1 | 1/2018 | Redko et al. | |

(Continued)

OTHER PUBLICATIONS

Office Action dated Jul. 16, 2018, pp. 14, for U.S. Appl. No. 15/589,373.

(Continued)

*Primary Examiner* — Kamini B Patel
(74) *Attorney, Agent, or Firm* — Rabindranath Dutta; Konrad Raynes Davda & Victor LLP (57) ABSTRACT

Provided are a method, system, and computer program product in which a computational device stores a data structure that includes identifications of a plurality of volumes and identifications of one or more time locks associated with each of the plurality of volumes. The data structure is indexed into, to determine whether an input/output (I/O) operation from a host with respect to a volume is to be permitted.

21 Claims, 10 Drawing Sheets

(56) References Cited

U.S. PATENT DOCUMENTS

| | | | |
|---|---|---|---|
| 2002/0026588 A1* | 2/2002 | Sauvage | G06F 9/468 726/26 |
| 2002/0138691 A1* | 9/2002 | Yamamoto | G06F 21/6218 711/112 |
| 2004/0153691 A1* | 8/2004 | Fujimoto | G06F 11/0724 714/3 |
| 2005/0050364 A1* | 3/2005 | Feng | H04L 63/1458 726/4 |
| 2006/0085608 A1 | 4/2006 | Saika | |
| 2006/0095682 A1 | 5/2006 | Fuente et al. | |
| 2007/0124545 A1* | 5/2007 | Blanchard | G06F 9/526 711/152 |
| 2010/0031315 A1* | 2/2010 | Feng | G06F 21/554 726/3 |
| 2010/0077165 A1* | 3/2010 | Lu | G06F 11/1451 711/162 |
| 2010/0223241 A1 | 9/2010 | Hussain et al. | |
| 2010/0250504 A1* | 9/2010 | Balasubramanian | G06F 17/30306 707/696 |
| 2011/0173154 A1* | 7/2011 | Chauvet | G06F 17/30286 707/610 |
| 2011/0185136 A1* | 7/2011 | Gavrilov | G06F 17/303 711/162 |
| 2011/0185253 A1 | 7/2011 | Resch et al. | |
| 2012/0102350 A1* | 4/2012 | Belluomini | G06F 1/3221 713/324 |
| 2014/0019699 A1* | 1/2014 | Cohen | G06F 12/14 711/163 |
| 2014/0026002 A1* | 1/2014 | Haines | G06F 11/0766 714/57 |
| 2014/0109182 A1 | 4/2014 | Smith et al. | |
| 2015/0100557 A1* | 4/2015 | Golod | G06F 17/30336 707/696 |
| 2015/0248333 A1 | 9/2015 | Aravot | |
| 2015/0363125 A1 | 12/2015 | Vijayakumari Rajendran Nair et al. | |
| 2016/0036788 A1 | 2/2016 | Conrad et al. | |
| 2018/0114387 A1 | 4/2018 | Klink et al. | |
| 2018/0321849 A1* | 11/2018 | Borlick | G06F 3/065 |
| 2018/0321850 A1* | 11/2018 | Borlick | G06F 3/065 |
| 2018/0322071 A1 | 11/2018 | Borlick et al. | |

OTHER PUBLICATIONS

Office Action dated Sep. 4, 2018, pp. 24, for U.S. Appl. No. 15/589,349.
List of IBM Patents or Patent Applications Treated as Related, dated May 8, 2017, pp. 2.
U.S. Appl. No. 15/589,341, filed May 8, 2017.
U.S. Appl. No. 15/589,349, filed May 8, 2017.
U.S. Appl. No. 15/589,373, filed May 8, 2017.
R.C. Daley, et al., "A General-purpose File System for Secondary Storage," Proceedings of the Nov. 30-Dec. 1, 1965, Fall Joint Computer Conference, Part I, pp. 213-229, ACM, 1965.
"Enhanced Application Security via Time Constrained Functionality," IP.com No. IPCOM000234628D, Jan. 23, 2014, pp. 4.
Office Action dated Oct. 15, 2018, pp. 29, for U.S. Appl. No. 15/589,341.
Response dated Oct. 15, 2018, pp. 7 ,to Office Action dated Jul. 16, 2018, pp. 14, for U.S. Appl. No. 15/589,373.
Response dated Jan. 8, 2019, pp. 22, to Office Action dated Oct. 19, 2018, pp. 29, for U.S. Appl. No. 15/589,341.
Response dated Apr. 10, 2019, pp. 3, to Final Office Action dated Jan. 18, 2019, pp. 26, for U.S. Appl. No. 15/589,373.
Notice of Allowance dated Apr. 17, 2019, pp. 27, for U.S. Appl. No. 15/589,341.
Response dated Apr. 24, 2019, pp. 11, to Final Office Action dated Jan. 24, 2019, pp. 16, U.S. Appl. No. 15/589,349.
Notice of Allowance dated Jul. 25, 2019, pp. 10, for U.S. Appl. No. 15/589,341.
Final Office Action dated Jan. 24, 2019, pp. 16, U.S. Appl. No. 15/589,349.
Final Office Action dated Jan. 18, 2019, pp. 26, for U.S. Appl. No. 15/589,373.
Response dated Dec. 4, 2018, pp. 12, to Office Action dated Sep. 4, 2018, pp. 24, for U.S. Appl. No. 15/589,349.
Notice of Allowance dated Aug. 7, 2019, pp.. 17, for U.S. Appl. No. 15/589,349.
Notice of Allowance dated Aug. 6, 2019, pp. 19, for U.S. Appl. No. 15/589,373.

\* cited by examiner

PERFORMANCE EFFICIENT TIME LOCKS ON DATA IN A STORAGE CONTROLLER

BACKGROUND

1. Field

Embodiments relate to performance efficient time locks on data in a storage controller.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include a cache. Data written from a host may be stored in the cache and at an opportune time the data stored in the cache may be destaged (i.e., moved or copied) to a storage device. Data may also be staged (i.e., moved or copied) from a storage device to the cache of the storage controller. The storage controller may respond to a read I/O request from the host from the cache, if the data for the read I/O request is available in the cache, otherwise the data may be staged from a storage device to the cache for responding to the read I/O request. A write I/O request from the host causes the data corresponding to the write to be written to the cache, and then at an opportune time the written data may be destaged from the cache to a storage device. Since the storage capacity of the cache is relatively small in comparison to the storage capacity of the storage devices, data may be periodically destaged from the cache to create empty storage space in the cache. Data may be written and read from the cache much faster in comparison to reading and writing data from a storage device.

A time lock is a mechanism that locks data for a period of time. U.S. Pat. No. 9,218,295 describes a method for implementing time locks. U.S. Pat. No. 8,185,754 describes a method for time-based storage access. The method includes associating a plurality of storage volumes with specific periods of time during which they may be accessed. U.S. Pat. No. 7,313,557 describes a multi-protocol lock manager that manages granting, revoking and releasing of various types of locks on files. U.S. Pat. No. 7,010,493 describes a method for managing access to storage resources according to an access time.

SUMMARY OF THE PREFERRED EMBODIMENTS

Provided are a method, system, and computer program product in which a computational device stores a data structure that includes identifications of a plurality of volumes and identifications of one or more time locks associated with each of the plurality of volumes. The data structure is indexed into, to determine whether an input/output (I/O) operation from a host with respect to a volume is to be permitted. As a result of storing the data structure in the computational device (e.g., in a cache of a storage controller), I/O operations may be analyzed for time locks much faster in comparison to situations in which time locks are stored as metadata of data in storage devices coupled to the computational device.

In certain embodiments, in response to determining that an identification of the volume is present in the data structure, a determination is made as to whether the I/O operation meets a criteria for a time lock. In response to determining that the I/O operation meets the criteria for the time lock, an error condition is transmitted to the host. As a result, the host is not allowed to perform the I/O operation on time locked data.

In further embodiments, the I/O operation meets the criteria for the time lock, in response to determining that the time lock covers a time at which the I/O operation is being performed, in response to determining that the time lock covers an entirety of the volume or part of the volume the I/O operation is intended for, and in response to determining that the time lock covers a type of the I/O operation. As a result, time locks are applied for certain volumes or parts of volumes for a predetermined period of time for certain types of I/O operations.

In additional embodiments, in response to determining that I/O operation does not meet the criteria for the time lock, the I/O operation is performed on the volume. As a result, the I/O operation is performed on data that is not protected via a time lock.

In further embodiments, in response to determining that an identification of the volume is not present in the data structure, the I/O operation is performed on the volume. As a result, the I/O operation is performed on data that is not protected via a time lock.

In certain embodiments, a time lock indicates at least: one or more volumes or parts of volumes protected by the time lock; duration of time for which the time lock is in effect; and types of I/O operation disallowed by the time lock. As a result, the time lock protects data stored in volumes or parts of volumes for a predetermined duration of time against certain types of I/O operations on the data.

In additional embodiments, the data structure and the one or more time locks are pinned to a cache of the computational device. As a result of storing the data structure and the one or more time locks in the cache, I/O commands from the host may be analyzed relatively faster to determine whether the I/O commands are for time locked data, in comparison to storing the one or more time locks in a storage device outside the computational device.

In further embodiments, the one or more time locks are destaged to a storage device to store as a metadata of data that is protected by the one or more time locks, wherein the metadata is used to recover the one or more time locks and the data structure, in response to a power failure of the computational device. As a result, time locks are stored redundantly in the storage device and also guard against power failure in the computational device (e.g., the storage controller).

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

There may be several reasons for a storage controller to protect data with a time lock. For example, there may be legal reasons to not allow access to data for a certain period of time. In situations where no one accesses certain data during certain periods of time, the time lock may provide a safety mechanism to prevent a breach of access to the data during those times. In certain embodiments, a time lock may be used for data that is no longer needed for foreseeable future but still needs to be retained.

Certain embodiments provide a storage controller to store data received from a host. The storage controller provides a selectable time lock for data being stored. The time lock is active for a defined time period for certain volumes and/or portions of certain volumes. A definition of the actions being prevented by the time lock is also provided by the storage controller.

In certain embodiments, time locks are created for data and stored in storage disks. The time locks are also cached in the storage controller to provide an efficient mechanism for time locks. In certain embodiments the time locks are used to control access (read and/or write I/O) to specified ranges of storage (e.g., to volumes/sections/groups of volumes).

In certain embodiments, a time lock table is maintained in the storage controller, where the time lock table includes identifications of volumes that have one or more time locks associated with them. The time lock table is stored in the cache of the storage controller and is used to determine whether a volume should be made available to the host in response to an I/O request from the host. Storing the time lock table and time locks in the cache improves the processing time for I/O operations in comparison to situations in which time locks are maintained only in the storage devices.

Exemplary Embodiments

Figure 1:
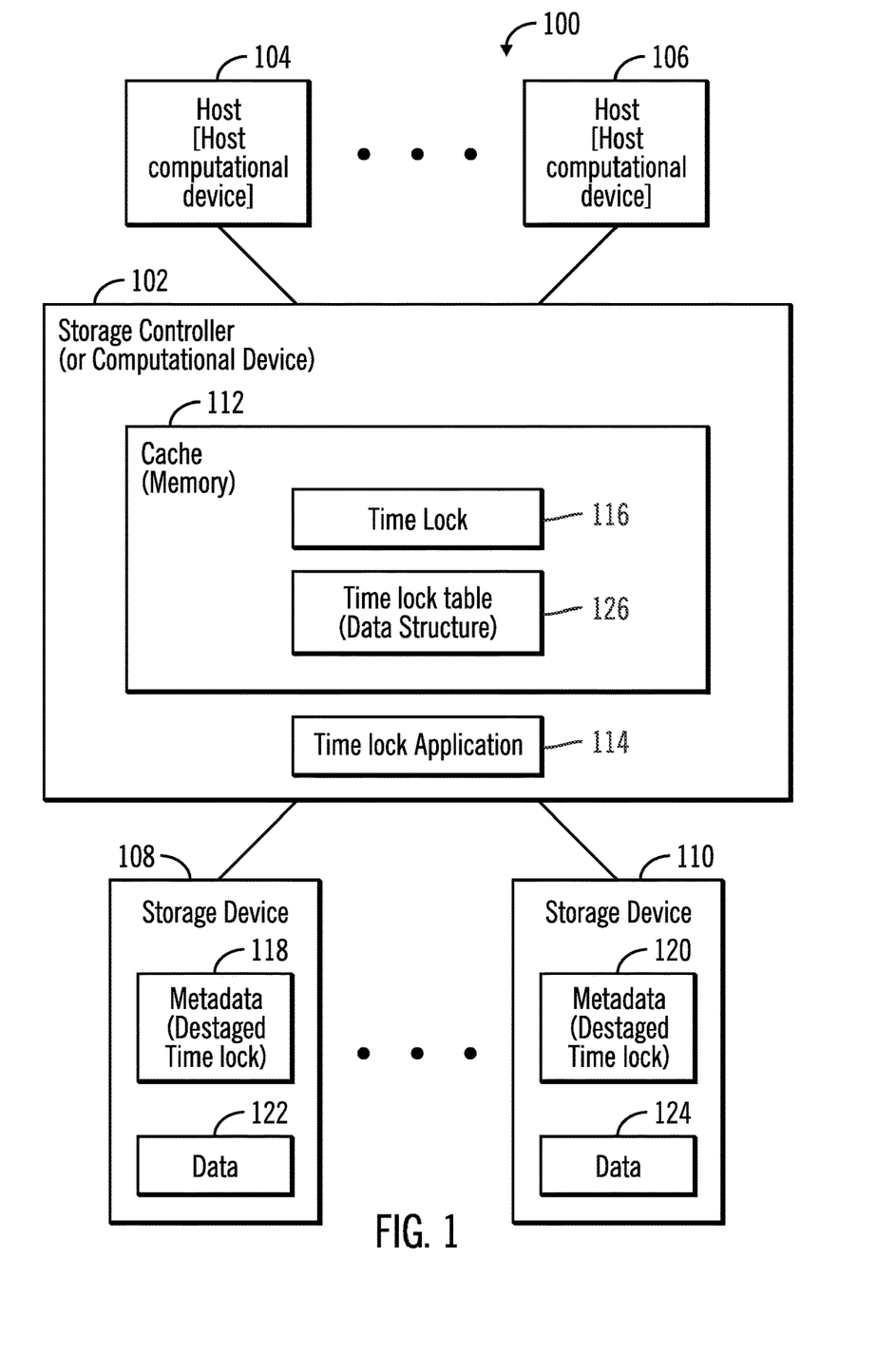
FIG. 1 illustrates a block diagram of a computing environment comprising a storage controller coupled to one or more hosts, and one or more storage devices for performance efficient time locks on data, in accordance with certain embodiments.

FIG. 1 illustrates a block diagram of a computing environment 100 comprising a storage controller 102 coupled to one or more hosts 104, 106, and one or more storage devices 108, 110, in accordance with certain embodiments. The storage controller 102 allows the plurality of hosts 104, 106 to perform input/output (I/O) operations with logical storage maintained by the storage controller 102. The physical storage corresponding to the logical storage may be found in one or more of the storage devices 108, 110 and/or a cache 112 (e.g., a memory) of the storage controller.

The storage controller 102 and the hosts 104, 106 may comprise any suitable computational device including those presently known in the art, such as, a personal computer, a workstation, a server, a mainframe, a hand held computer, a palm top computer, a telephony device, a network appliance, a blade computer, a processing device, etc. The storage controller 102, the hosts 104, 106, and the storage devices 108, 110 may be elements in any suitable network, such as, a storage area network, a wide area network, the Internet, an intranet. In certain embodiments, the storage controller 102, the hosts 104, 106, and the storage devices 108, 110 may be elements in a cloud computing environment that comprises the computing environment 100. The storage devices 108, 110 may be comprised of storage disks, tape drives, solid state storage, etc., and may be controlled by the storage controller 102.

In certain embodiments, a time lock application 114 that executes in the storage controller 102 may generate one or more time locks 116 to protect data for a predetermined duration of time. The time lock application 114 may be implemented in software, hardware, firmware or any combination thereof.

In certain embodiments, the time lock 116 is stored in the cache 112 of the storage controller 102. The time lock 116 may be synchronously destaged to a storage device and stored in the storage device as metadata 118, 120 for data 122, 124 being protected by the time lock, but the time lock 116 is still maintained in the cache 112 after destage to the storage device. For example, if the data 122 stored in storage device 108 is being protected by the time lock 116, then the time lock 116 is synchronously destaged to the storage device 108 from the cache 112 to be maintained as metadata 118 for the data 122 that is stored in the storage device 108. Similarly, if the data 124 stored in storage device 110 is being protected by the time lock 116, then the time lock 116 is synchronously destaged to the storage device 110 from the cache 112 to be maintained as metadata 120 for the data 124 that is stored in the storage device 108.

In certain embodiments, the time lock application 114 also maintains a time lock table 126 in the cache 112 of the storage controller. The time lock table 126 stores a sorted list of all volumes that have one or more time locks, so that I/O operations from a host are efficiently processed.

Figure 2:
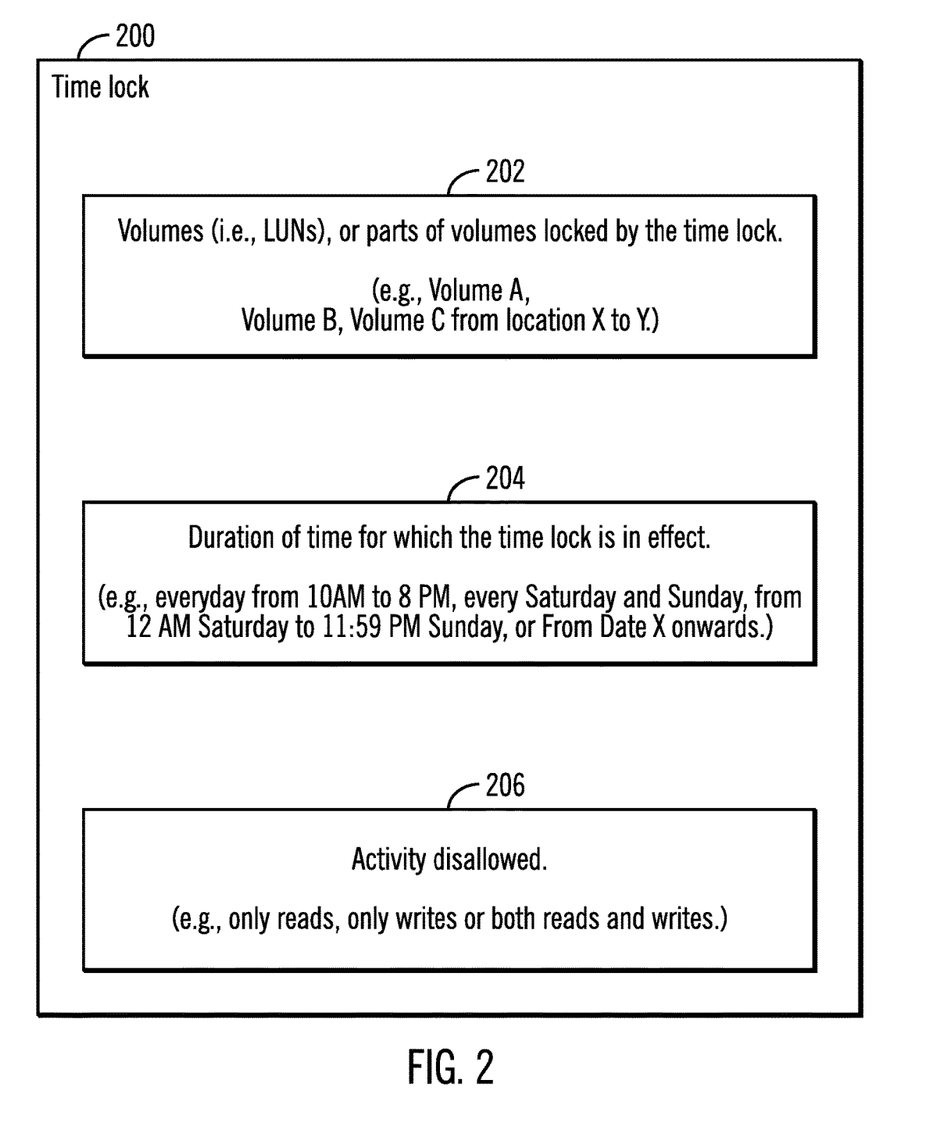
FIG. 2 illustrates a block diagram that shows elements described by an exemplary time lock, in accordance with certain embodiments.

FIG. 2 illustrates elements described by an exemplary time lock 200 that in certain embodiments may comprise the time lock 116 shown in FIG. 1. The time lock 200 may indicate volumes [(i.e., logical units (LUNs)] and/or parts of volumes locked by the time lock 200 (as shown via reference numeral 202). For example, in certain embodiments the time lock 200 may indicate that volume A, volume B, and volume C from location X to location Y are locked by the time lock 200.

The time lock 200 may also indicate the duration for which the time lock 200 is in effect (as shown via reference numeral 204). For example, in certain embodiments, the time lock 200 may be in effect every day from 10 AM to 8 PM. In other embodiments, the time lock 200 may be in effect for the whole day every Saturday and Sunday. In still further embodiments, the time lock 200 may be in effect from 12 AM Saturday to 11:59 PM Sunday. In yet another embodiment, the time lock may be in effect from Date X onwards (e.g., from Dec. 12, 2017 onwards).

The time lock 200 may also indicate the activity disallowed by the time lock 200 (as shown via reference numeral 206). For example, in certain embodiments the time lock 200 may indicate that only reads are disallowed. In other embodiments the time lock 200 may indicate that only writes are disallowed. In yet another embodiment, the time lock 200 may indicate that both reads and writes are disallowed.

Figure 3:
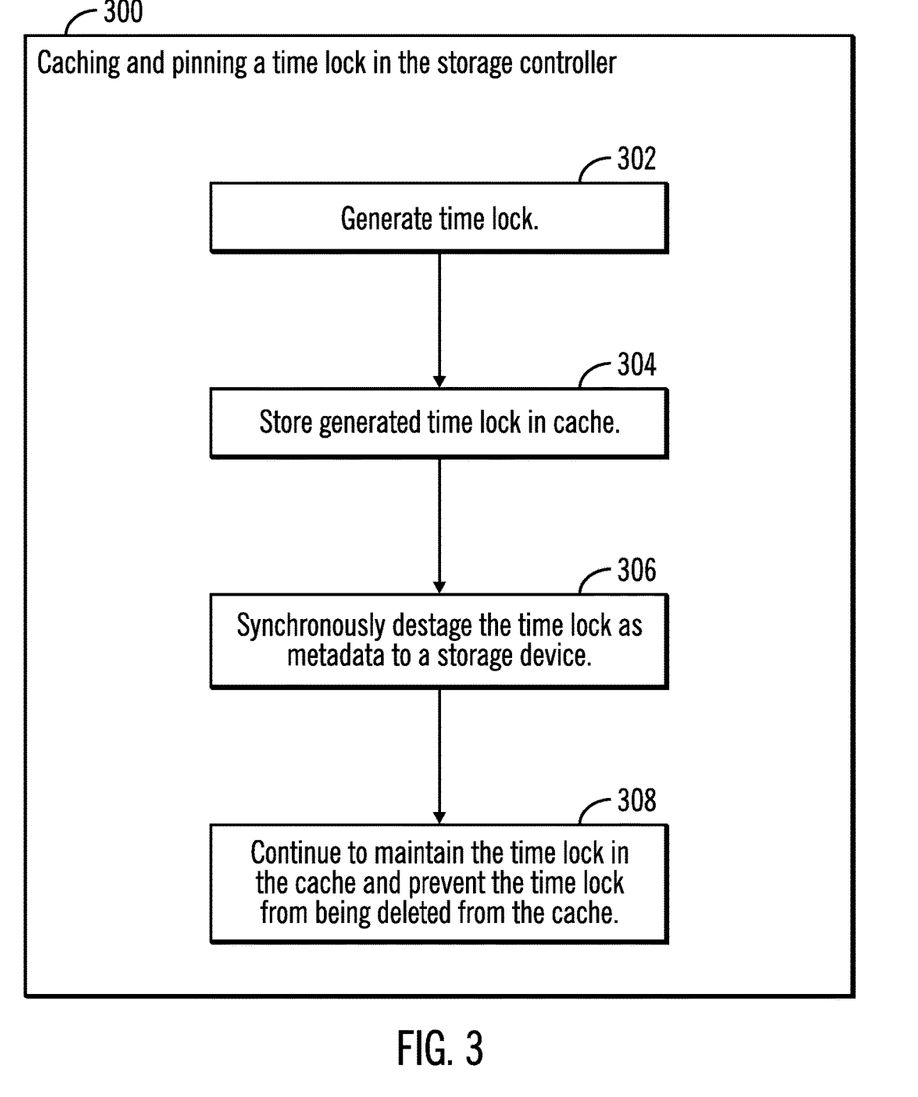
FIG. 3 illustrates a flowchart that shows caching and pinning of a time lock in the storage controller, in accordance with certain embodiments.

FIG. 3 illustrates a flowchart 300 that shows caching and pinning (i.e., storing and protecting from being deleted) of a time lock in the storage controller 102. Control starts at block 302 in which the time lock application 114 generates a time lock for protecting data 122, where the data 122 is physically stored in a storage device 108. The time lock application 114 stores the generated time lock (shown as time lock 116 in FIG. 1) in the cache 112 of the storage controller 102 (at block 304).

From block 304 control proceeds to block 306, in which the time lock application 114 synchronously destages the time lock 116 from the cache 112 to the storage device 108, where the destaged time lock is stored as metadata 118 of the data 122 that is physically stored in the storage device 108. Synchronous destage of the time lock 116 means that the time lock application 114 waits for acknowledgement of completion of copying of the time lock 116 to the storage device 108, prior to indicating to the host or the storage controller 102 that the process of time lock generation is complete. In case of a power loss in the storage controller 102 the time locks stored in the storage device 108 are used to recreate the time locks 116 and the time lock table 128 stored in the storage controller 102.

The time lock application 114 continues to maintain (at block 308) the time lock 116 in the cache 112 and prevents the time lock from being deleted from the cache 112 (i.e., the time lock 116 is pinned to the cache 112).

Figure 4:
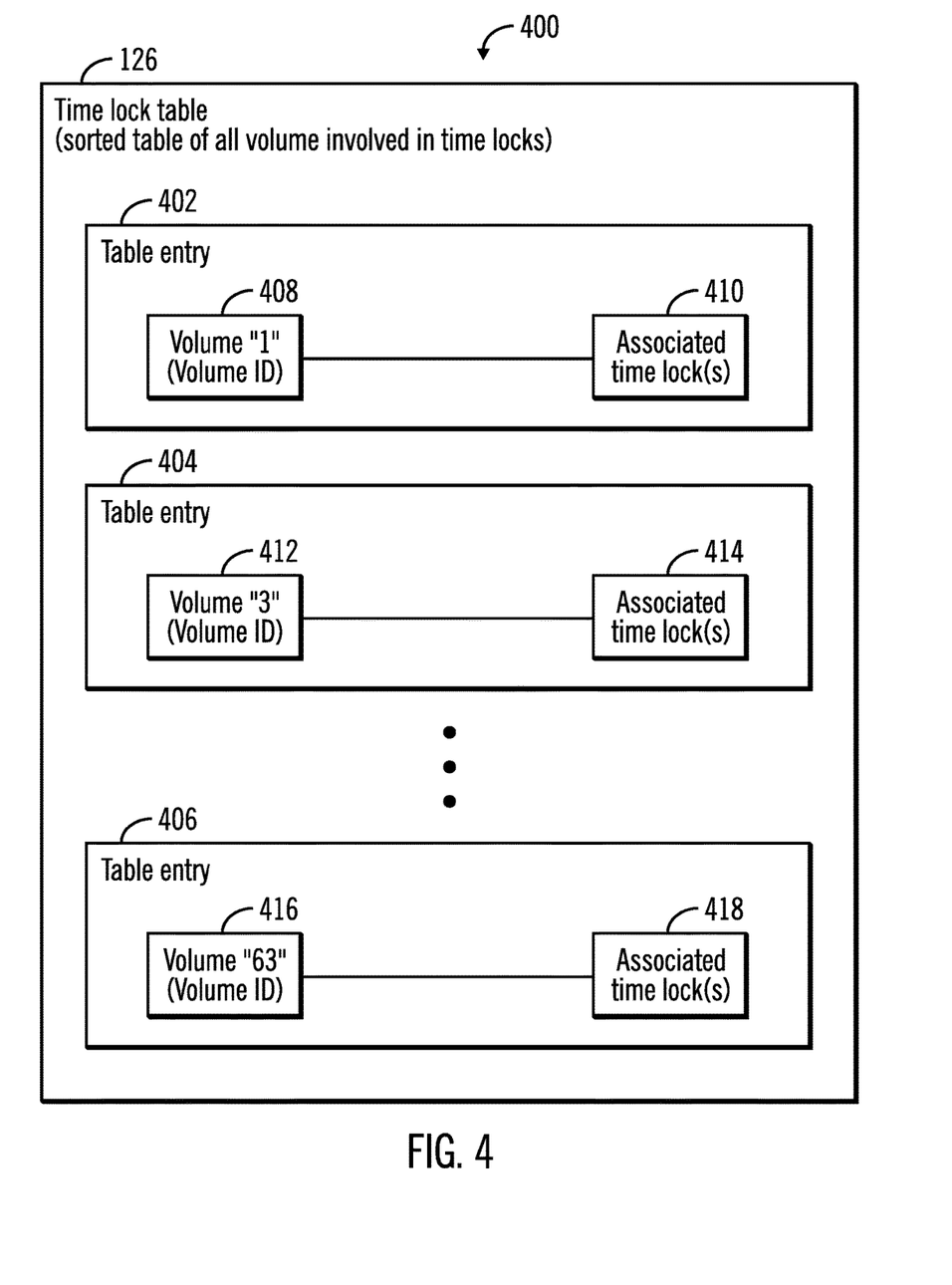
FIG. 4 illustrates a block diagram that shows a time lock table stored in the cache of the storage controller, in accordance with certain embodiments.

FIG. 4 illustrates a block diagram 400 that shows a time lock table 126 stored in the cache 112 of the storage controller 102. The time lock table 126 is a sorted table for all the volumes that have time locks, and is created in the cache 112 of the storage controller 102. Each entry in the time lock table 126 contains the volume identifier of a volume and identities of the one or more time locks that the volume is associated with.

For example, in FIG. 4, there are a plurality of table entries 402, 404, 406 that stores identifications of volumes associated with one or more time locks in a sorted order. For example, table entry 402 shows volume "1" 408 and associated time locks 410, table entry 404 shows volume "3" 412 and associated time locks 414, and table entry 406 shows volume "63" 416 and associated time locks 418.

Figure 5:
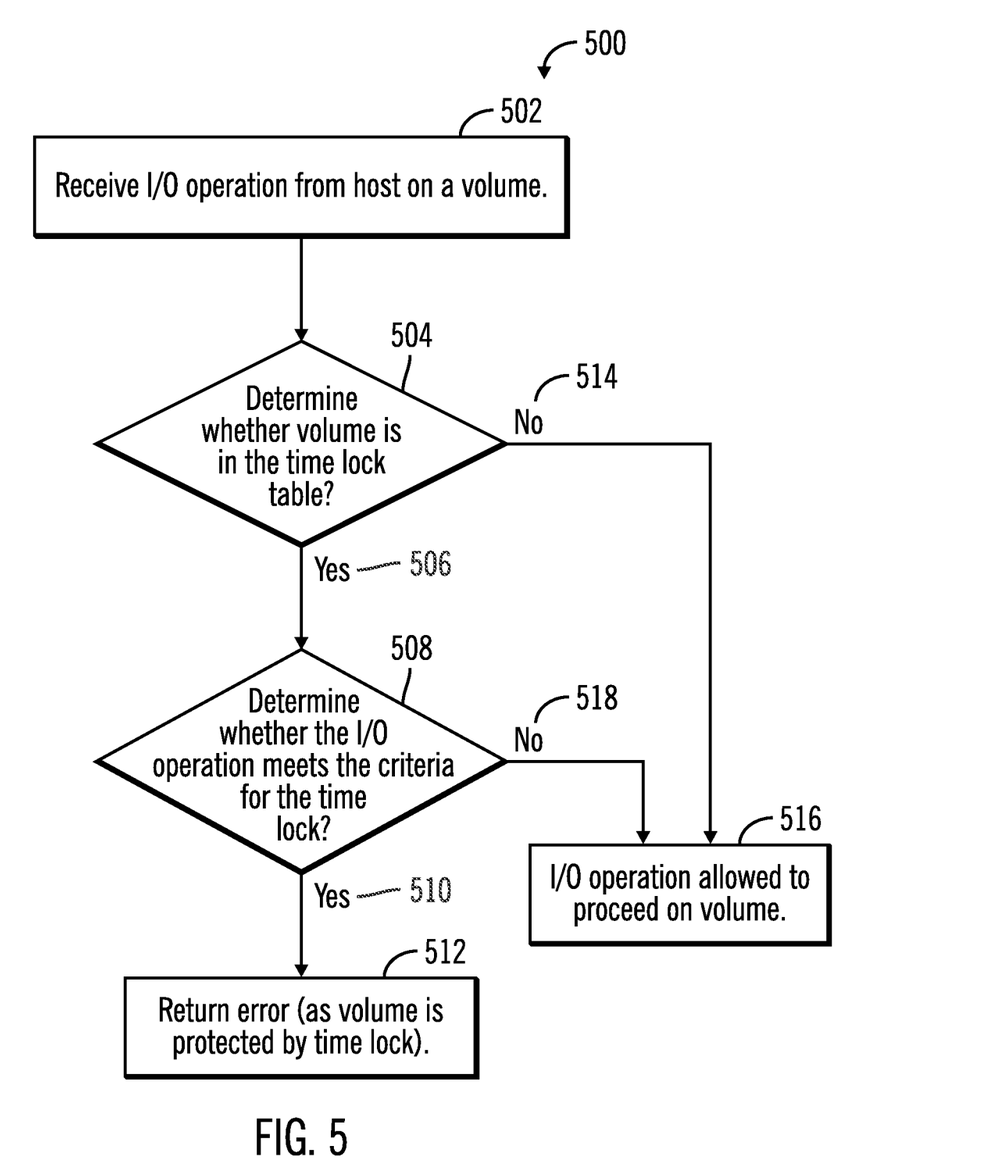
FIG. 5 illustrates a flowchart that shows how I/O operations from a host are processed by the storage controller, in accordance with certain embodiments.

FIG. 5 illustrates a flowchart 500 that shows how I/O operations from a host are processed by the storage controller 102. The operations shown in FIG. 5 may be performed in the storage controller 102.

Control starts at block 502 in which storage controller 102 receives an I/O operation on a volume from a host 104. The time lock application 114 determines (at block 504) from the time lock table 126 whether the volume is in the time lock table 126. If so ("Yes branch 506) control proceeds to block 508 in which the time lock application 114 determines whether the I/O operation meets the criteria for the time locks associated with the volume, by analyzing the time locks associated with the volume in the time lock table 126. A time lock meets the criteria if all of below conditions are true: (a) The time lock on the volume covers the time of operation; (b) The time lock covers the entire volume or part of the volume, the I/O operation is intended for; (c) The time lock covers the operation type (read or write or both) of the I/O operation (read or write).

If the criteria is met ("Yes branch 510) control proceeds to block 512 in which the storage controller 102 returns an error condition to the host 104 to indicate that the I/O operation cannot be completed because of the time lock associated with the volume.

At block 504 if the volume is determined to be not in the time lock table ("No" branch 514) control proceeds to block 516 in which the I/O operation is allowed to proceed. Additionally, if at block 508, if it is determined that the criteria for the time lock is not met ("No" branch 518) then control proceeds to block 516 in which the I/O operation is allowed to proceed.

Since the time lock table 126 stores indications of volumes associated with a time lock in a sorted order in the cache 112, the time locks associated with a volume may be accessed much faster via indexing into the time lock table 126, in comparison to reading the metadata 118, 120 to determine time locks stored in the storage device 108, 110. As a result, time locks may be processed much faster in comparison to retrieving time locks from the storage devices 108, 110.

Figure 6:
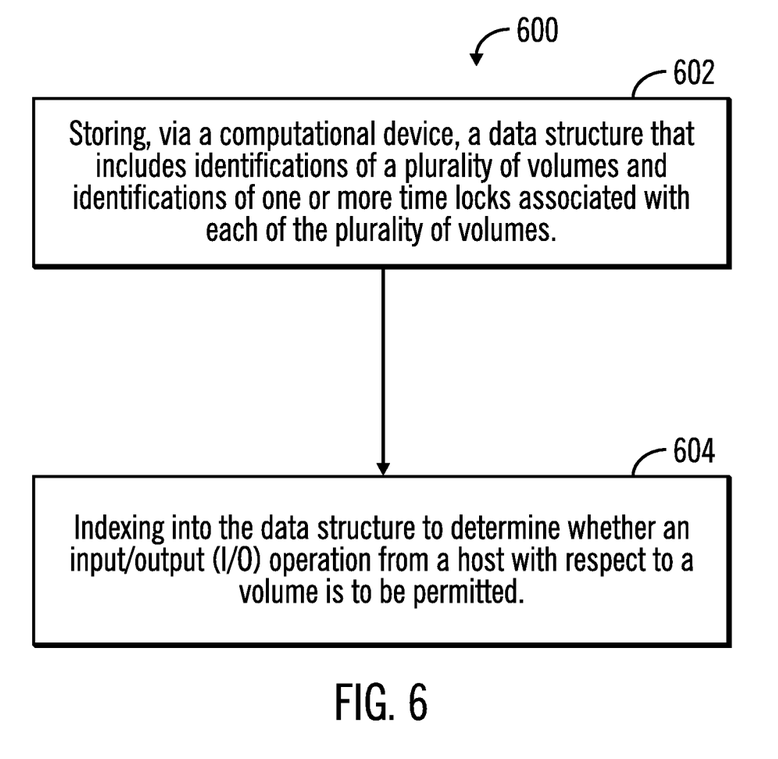
FIG. 6 illustrates a flowchart that shows operations for performance efficient time locks on data, in accordance with certain embodiments.

FIG. 6 illustrates a flowchart 600 that shows operations for performance efficient time locks on data, in accordance with certain embodiments. The operations shown in FIG. 6 may be performed in the storage controller 102.

Control starts at block 602 in which a computational device (e.g., the storage controller 102) stores a data structure (e.g., the time lock table 126) that includes identifications of a plurality of volumes and identifications of one or more time locks associated with each of the plurality of volumes. The data structure (e.g., the time lock table 126) is indexed into, to determine (at block 604) whether an I/O operation from a host 104 with respect to a volume is to be permitted.

Figure 7:
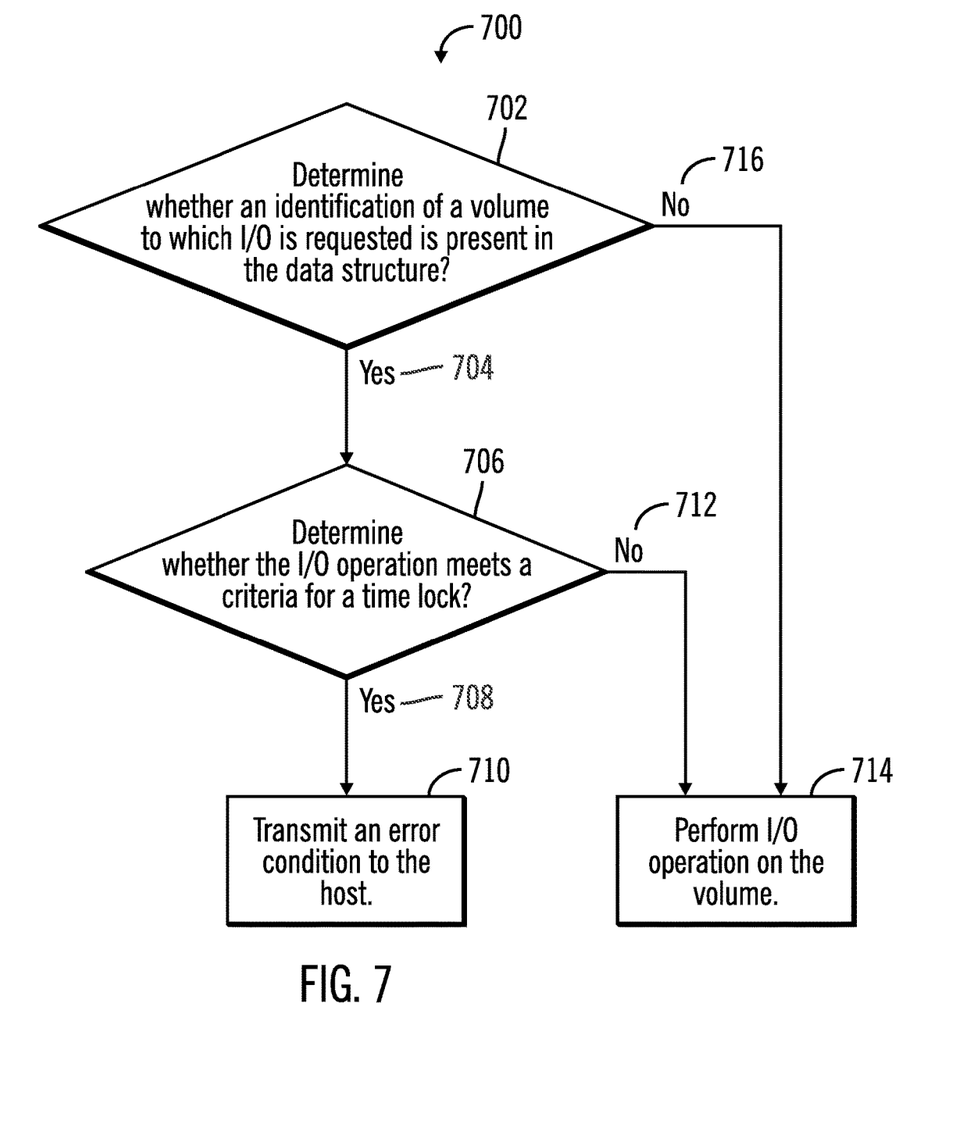
FIG. 7 illustrates a flowchart that shows additional operations for performance efficient time locks on data, in accordance with certain embodiments.

FIG. 7 illustrates a flowchart 700 that shows additional operations for performance efficient time locks on data, in accordance with certain embodiments. The operations shown in FIG. 7 may be performed in the storage controller 102.

Control starts at block 702 in which a determination is made as to whether an identification of a volume to which I/O is requested is present in the data structure (e.g., the time lock table 126). In certain embodiments, in response to determining ("Yes" branch 704) that an identification of the volume is present in the data structure, a determination is made (at block 706) as to whether the I/O operation meets a criteria for a time lock. In response to determining that the I/O operation meets the criteria for the time lock ("Yes" branch 708), an error condition is transmitted (at block 710) to the host.

In additional embodiments, in response to determining that I/O operation does not meet the criteria for the time lock ("No" branch 712), the I/O operation is performed (at block 714) on the volume. Also, in response to determining that an identification of the volume is not present in the data structure ("No" branch 716), the I/O operation is performed (at block 714) on the volume.

Therefore FIGS. 1-7 illustrate certain embodiments in which a data structure (e.g., a time lock table 126) is maintained, where the data structure includes identifications of volumes that have one or more time locks associated with them. The data structure (e.g. time lock table) is stored in the cache 112 of the storage controller 102 and used to determine whether a volume should be made available to the host in response to an I/O request from the host. Since the time lock table stores identifications of volumes in a sorted order in a cache, it is faster to respond to I/O requests taking into account time locks on data, in comparison to situations in which no time lock table is maintained in the cache, and metadata that stores time locks in storage devices have to be analyzed prior to responding to I/O requests from the hosts. Even if the time locks are stored in the cache 112 for faster access to time locks in comparison to accessing the time locks from storage devices 108, 110, the time lock table 126 still provides faster processing of I/O operations in comparison to not maintaining the time lock table 126, as indexing into the sorted volume identifiers of time lock table 126 allows faster determination of whether the I/O operations are to be allowed to proceed or be subjected to a time lock.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
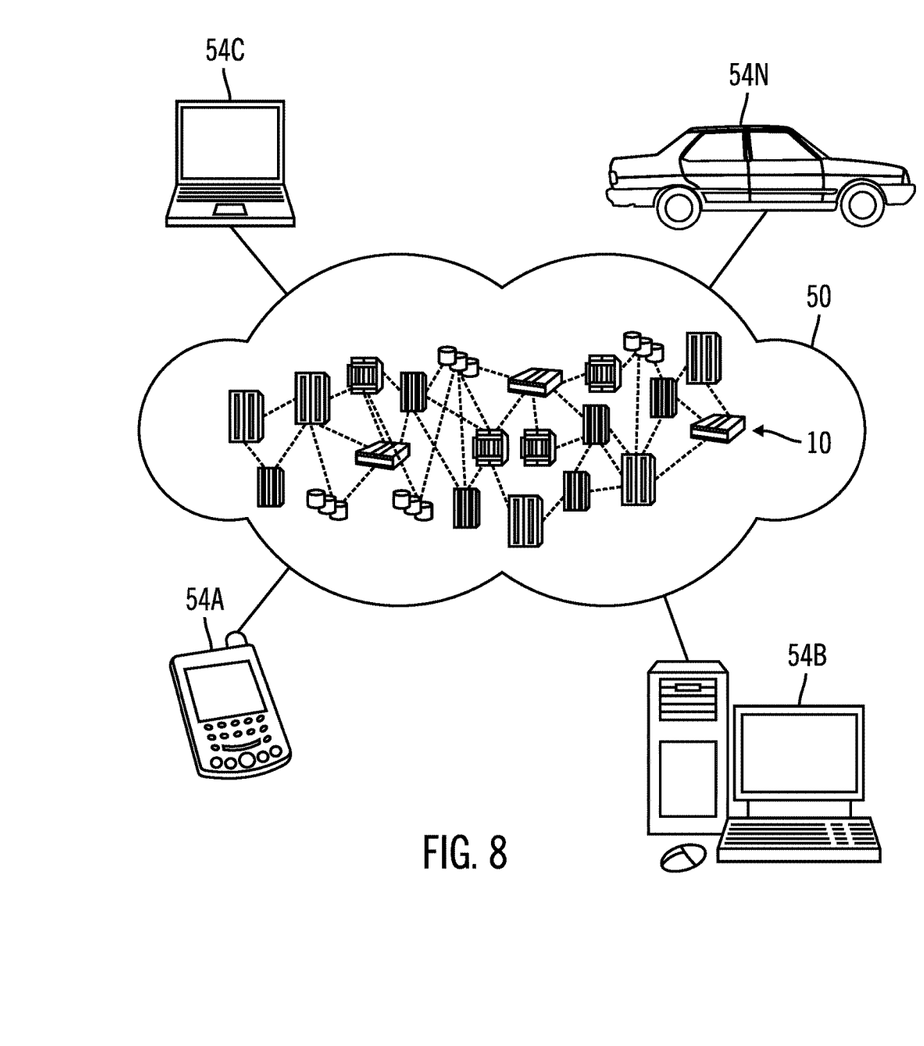
FIG. 8 illustrates a block diagram of a cloud computing environment, in accordance with certain embodiments.

Referring now to FIG. 8, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
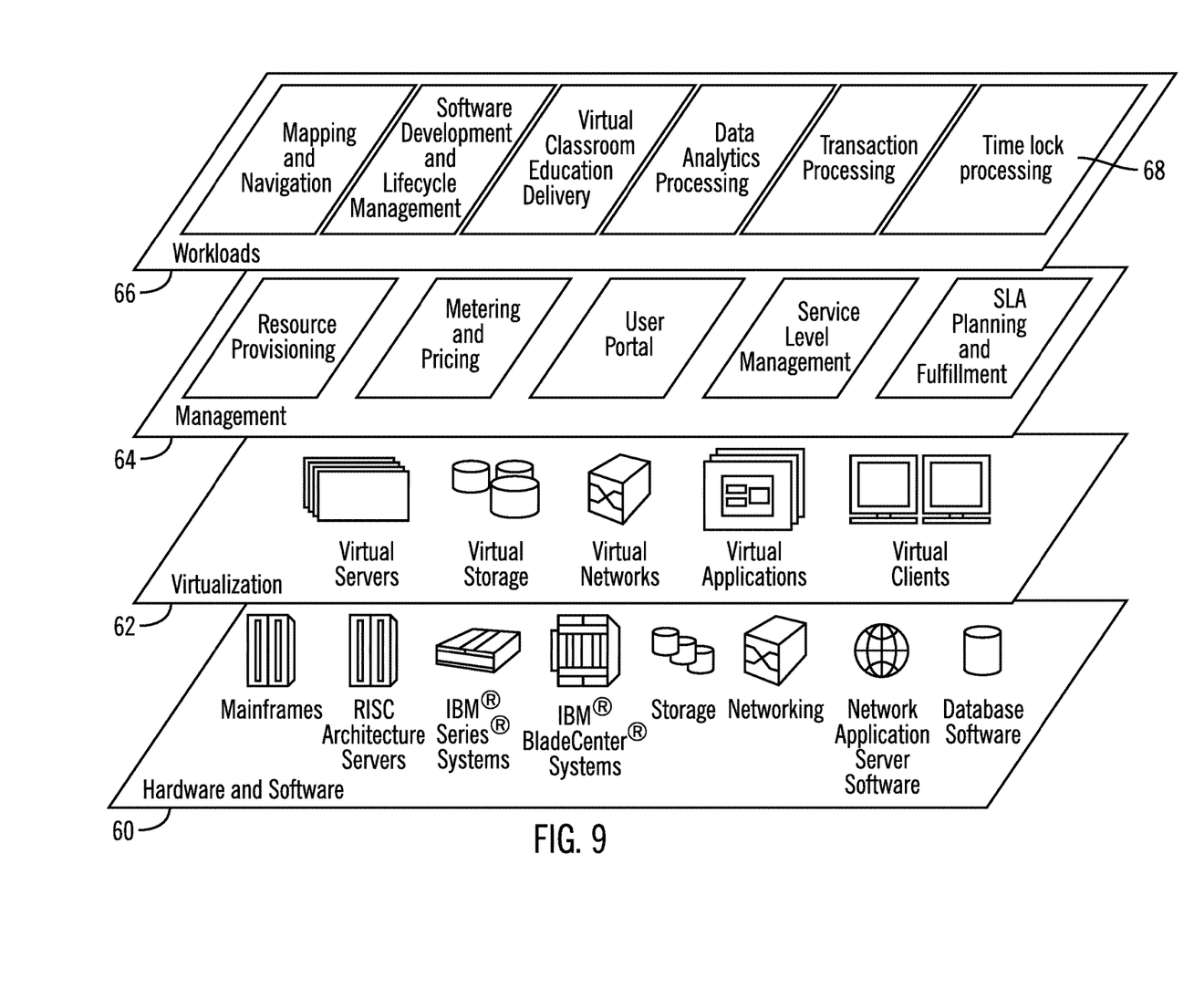
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and time lock processing 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
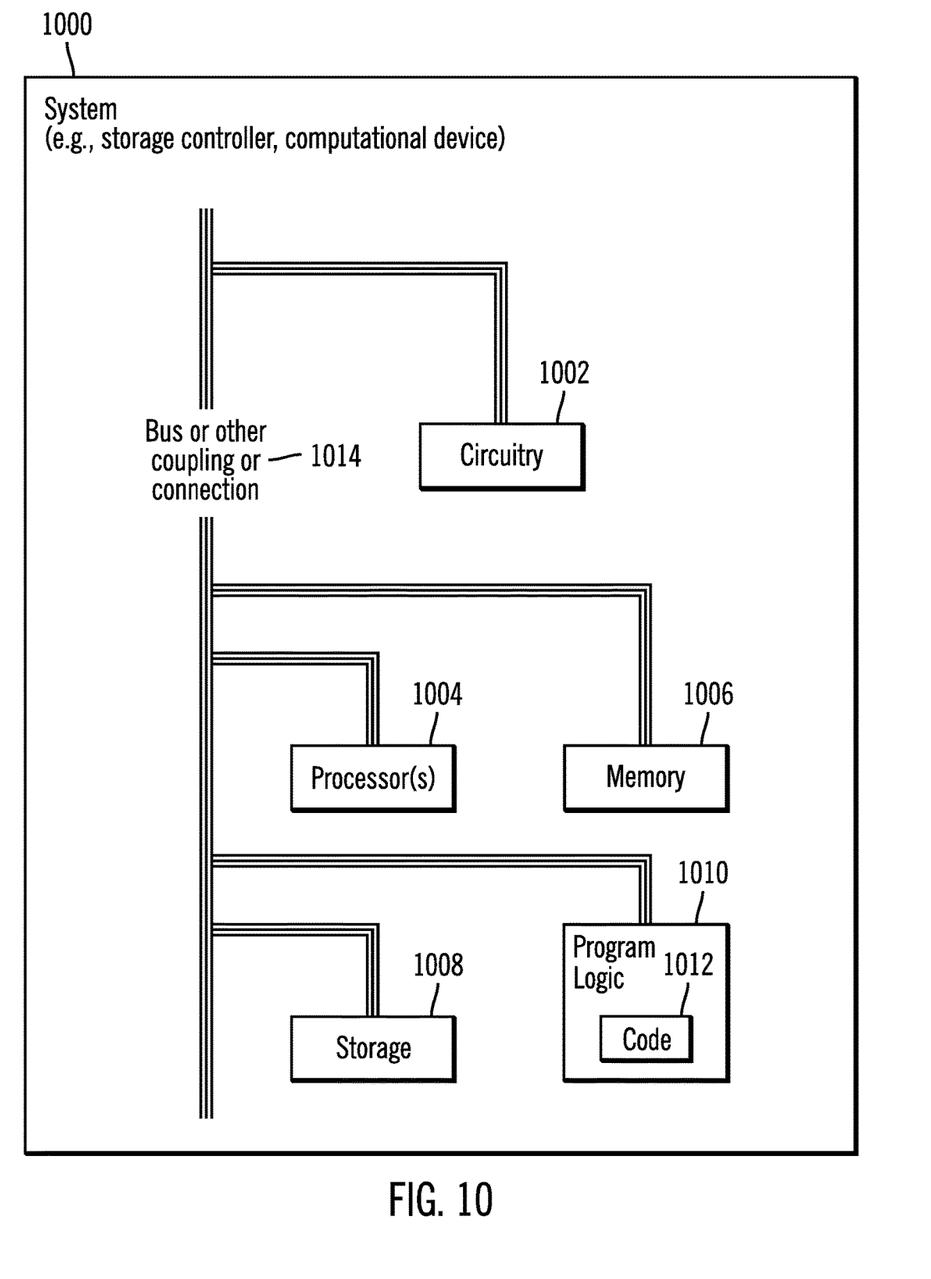
FIG. 10 illustrates a block diagram of a computational system that shows certain elements that may be included in the storage controller or the host, as described in FIGS. 1-9, in accordance with certain embodiments.

FIG. 10 illustrates a block diagram that shows certain elements that may be included in the storage controller 102, the hosts 104, 106, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    storing, via a computational device, a data structure that includes identifications of a plurality of volumes and identifications of one or more time locks associated with each of the plurality of volumes; and
    indexing into the data structure to determine whether an input/output (I/O) operation from a host with respect to a volume is to be permitted, wherein a time lock indicates at least:
    one or more volumes or parts of volumes protected by the time lock;
    duration of time for which the time lock is in effect; and
    types of I/O operation disallowed by the time lock, the method further comprising:
        in response to determining that an identification of the volume is present in the data structure, determining whether the I/O operation meets a criteria for the time lock; and
        in response to determining that the I/O operation meets the criteria for the time lock, transmitting an error condition to the host.

2. The method of claim 1, wherein the I/O operation meets the criteria for the time lock, in response to determining that the time lock covers a time at which the I/O operation is being performed, in response to determining that the time lock covers an entirety of the volume or part of the volume the I/O operation is intended for, and in response to determining that the time lock covers a type of the I/O operation.

3. The method of claim 1, the method further comprising:
    in response to determining that I/O operation does not meet the criteria for the time lock, performing the I/O operation on the volume.

4. A method, comprising:
    storing, via a computational device, a data structure that includes identifications of a plurality of volumes and identifications of one or more time locks associated with each of the plurality of volumes; and
    indexing into the data structure to determine whether an input/output (I/O) operation from a host with respect to a volume is to be permitted, wherein the data structure and the one or more time locks are pinned to a cache of the computational device, and wherein the one or more time locks are destaged to a storage device to store as a metadata of data that is protected by the one or more time locks, and wherein the metadata is used to recover the one or more time locks and the data structure, in response to a power failure of the computational device.

5. The method of claim 4, the method further comprising:
    in response to determining that an identification of the volume is not present in the data structure, performing the I/O operation on the volume.

6. A system, comprising:
a memory; and
a processor coupled to the memory, wherein the processor performs operations, the operations comprising:
storing a data structure that includes identifications of a plurality of volumes and identifications of one or more time locks associated with each of the plurality of volumes; and
indexing into the data structure to determine whether an input/output (I/O) operation from a host with respect to a volume is to be permitted, wherein a time lock indicates at least:
one or more volumes or parts of volumes protected by the time lock;
duration of time for which the time lock is in effect and
types of I/O operation disallowed by the time lock, the operations further comprising:
in response to determining that an identification of the volume is present in the data structure, determining whether the I/O operation meets a criteria for the time lock; and
in response to determining that the I/O operation meets the criteria for the time lock, transmitting an error condition to the host.

7. The system of claim 6, wherein the I/O operation meets the criteria for the time lock, in response to determining that the time lock covers a time at which the I/O operation is being performed, in response to determining that the time lock covers an entirety of the volume or part of the volume the I/O operation is intended for, and in response to determining that the time lock covers a type of the I/O operation.

8. The system of claim 6, the operations further comprising:
in response to determining that I/O operation does not meet the criteria for the time lock, performing the I/O operation on the volume.

9. A system, comprising:
a memory; and
a processor coupled to the memory, wherein the processor performs operations, the operations comprising:
storing a data structure that includes identifications of a plurality of volumes and identifications of one or more time locks associated with each of the plurality of volumes; and
indexing into the data structure to determine whether an input/output (I/O) operation from a host with respect to a volume is to be permitted, wherein the data structure and the one or more time locks are pinned to a cache of the system, and wherein the one or more time locks are destaged to a storage device to store as a metadata of data that is protected by the one or more time locks, and wherein the metadata is used to recover the one or more time locks and the data structure, in response to a power failure of the system.

10. The system of claim 9, the operations further comprising:
in response to determining that an identification of the volume is not present in the data structure, performing the I/O operation on the volume.

11. A computer program product, the computer program product comprising a computer readable storage medium having computer readable program code embodied therewith, the computer readable program code configured to perform operations on a processor of a computational device, the operations comprising:
storing a data structure that includes identifications of a plurality of volumes and identifications of one or more time locks associated with each of the plurality of volumes; and
indexing into the data structure to determine whether an input/output (I/O) operation from a host with respect to a volume is to be permitted, wherein a time lock indicates at least:
one or more volumes or parts of volumes protected by the time lock;
duration of time for which the time lock is in effect; and
types of I/O operation disallowed by the time lock, the operations further comprising:
in response to determining that an identification of the volume is present in the data structure, determining whether the I/O operation meets a criteria for the time lock; and
in response to determining that the I/O operation meets the criteria for the time lock, transmitting an error condition to the host.

12. The computer program product of claim 11, wherein the I/O operation meets the criteria for the time lock, in response to determining that the time lock covers a time at which the I/O operation is being performed, in response to determining that the time lock covers an entirety of the volume or part of the volume the I/O operation is intended for, and in response to determining that the time lock covers a type of the I/O operation.

13. The computer program product of claim 11, the operations further comprising:
in response to determining that I/O operation does not meet the criteria for the time lock, performing the I/O operation on the volume.

14. A computer program product, the computer program product comprising a computer readable storage medium having computer readable program code embodied therewith, the computer readable program code configured to perform operations on a processor of a computational device, the operations comprising:
storing a data structure that includes identifications of a plurality of volumes and identifications of one or more time locks associated with each of the plurality of volumes; and
indexing into the data structure to determine whether an input/output (I/O) operation from a host with respect to a volume is to be permitted, wherein the data structure and the one or more time locks are pinned to a cache of the computational device, and wherein the one or more time locks are destaged to a storage device to store as a metadata of data that is protected by the one or more time locks, and wherein the metadata is used to recover the one or more time locks and the data structure, in response to a power failure of the computational device.

15. The computer program product of claim 14, the operations further comprising:
in response to determining that an identification of the volume is not present in the data structure, performing the I/O operation on the volume.

16. A storage controller coupled to a host, the storage controller comprising:
a cache comprising a memory; and
a processor communicatively coupled to the cache and operable to perform operations, the operations comprising:

storing a data structure that includes identifications of a plurality of volumes and identifications of one or more time locks associated with each of the plurality of volumes; and indexing into the data structure to determine whether an input/output (I/O) operation from the host with respect to a volume is to be permitted, wherein a time lock indicates at least:

one or more volumes or parts of volumes protected by the time lock;

duration of time for which the time lock is in effect; and types of I/O operation disallowed by the time lock, the operations further comprising:

in response to determining that an identification of the volume is present in the data structure, determining whether the I/O operation meets a criteria for the time lock; and in response to determining that the I/O operation meets the criteria for the time lock, transmitting an error condition to the host.

17. The storage controller of claim 16, the operations further comprising:

in response to determining that an identification of the volume is present in the data structure, determining whether the I/O operation meets a criteria for the time lock; and in response to determining that the I/O operation meets the criteria for the time lock, transmitting an error condition to the host.

18. The storage controller of claim 16, wherein the I/O operation meets the criteria for the time lock, in response to determining that the time lock covers a time at which the I/O operation is being performed, in response to determining that the time lock covers an entirety of the volume or part of the volume the I/O operation is intended for, and in response to determining that the time lock covers a type of the I/O operation.

19. The storage controller of claim 16, the operations further comprising:

in response to determining that I/O operation does not meet the criteria for the time lock, performing the I/O operation on the volume.

20. A storage controller coupled to a host, the storage controller comprising:

a cache comprising a memory; and a processor communicatively coupled to the cache and operable to perform operations, the operations comprising:

storing a data structure that includes identifications of a plurality of volumes and identifications of one or more time locks associated with each of the plurality of volumes; and indexing into the data structure to determine whether an input/output (I/O) operation from the host with respect to a volume is to be permitted, wherein the data structure and the one or more time locks are pinned to the cache of the storage controller, wherein the one or more time locks are destaged to a storage device to store as a metadata of data that is protected by the one or more time locks, and wherein the metadata is used to recover the one or more time locks and the data structure, in response to a power failure of the storage controller.

21. The storage controller of claim 20, the operations further comprising:

in response to determining that an identification of the volume is not present in the data structure, performing the I/O operation on the volume.

* * * * *